United States Patent [19]

Reed

[11] Patent Number: 5,266,680
[45] Date of Patent: Nov. 30, 1993

[54] PROCESS FOR THE PREPARATION OF POLY(ARYLENE SULFIDE) COMPOSITIONS

[75] Inventor: Jerry O. Reed, Bartlesville, Okla.

[73] Assignee: Phillips Petroleum Company, Bartlesville, Okla.

[21] Appl. No.: 905,077

[22] Filed: Jun. 24, 1992

Related U.S. Application Data

[63] Continuation of Ser. No. 784,137, Oct. 29, 1991, abandoned, which is a continuation of Ser. No. 387,252, Jul. 31, 1989, abandoned.

[51] Int. Cl.$^5$ .................. C08G 75/14; C08F 6/00; B32B 9/04; B32B 27/06
[52] U.S. Cl. .................. 528/388; 428/411.1; 428/419; 528/488; 528/489; 528/499
[58] Field of Search .............. 528/388, 488, 489, 499; 428/411.1, 419

[56] References Cited

U.S. PATENT DOCUMENTS

| | | | |
|---|---|---|---|
| 3,912,695 | 10/1975 | Short et al. | 528/388 |
| 3,912,696 | 10/1975 | Doughty | 528/388 |
| 3,919,177 | 11/1975 | Campbell | 528/373 |
| 4,373,091 | 2/1983 | Edmonds | 528/481 |
| 4,415,729 | 11/1983 | Scoggins et al. | 528/388 |
| 4,495,332 | 1/1985 | Shiiki et al. | 524/800 |
| 4,537,953 | 8/1985 | Kawakami et al. | 528/388 |
| 4,588,789 | 5/1986 | Scoggins et al. | 525/537 |
| 4,629,778 | 12/1986 | Sugie et al. | 528/388 |
| 4,645,826 | 2/1987 | Iizuka et al. | 525/537 |
| 4,730,034 | 3/1988 | Nesheiwat et al. | 528/388 |
| 4,786,711 | 11/1988 | Senatore et al. | 528/388 |
| 4,794,162 | 12/1988 | Ostlinning et al. | 528/388 |
| 4,898,904 | 2/1990 | Yu et al. | 524/399 |
| 4,960,841 | 10/1990 | Kawabata et al. | 525/537 |

FOREIGN PATENT DOCUMENTS 0311040 12/1989 European Pat. Off.

Primary Examiner—John Kight, III
Assistant Examiner—T. Mosley
Attorney, Agent, or Firm—Beverly M. Dollar

[57] ABSTRACT

A method is provided for the production of poly(arylene sulfide) compositions comprising a) contacting under suitable conditions a sulfur source, a dihalogenated aromatic compound and optionally other halogenated aromatic compounds, a polar organic compound, a base, and an alkali metal carboxylate in order to form a substantially liquid mixture comprising poly(arylene sulfide) polymer, polar organic compound and water;

b) slowly cooling to form a slurry comprising solid poly(arylene sulfide) particles and liquid comprising the polar organic compound and water and adding an effective amount of at least one extraction agent;

c) contacting the poly(arylene sulfide) particles with an aqueous solution containing calcium ions; and d) recovering the poly(arylene sulfide) composition.

The poly(arylene sulfide) compositions prepared according to the invention method are especially useful for the preparation of fibers and monofilaments.

24 Claims, No Drawings

PROCESS FOR THE PREPARATION OF POLY(ARYLENE SULFIDE) COMPOSITIONS

This application is a continuation under 37 C.F.R. 1.62 of application Ser. No. 07/784,137, filed Oct. 29, 1991, now abandoned, which is a continuation under 37 C.F.R. 1.62, of prior application Ser. No. 07/387,252, filed on Jul. 31, 1989, now abandoned.

FIELD OF THE INVENTION

This invention relates to processes for the production of poly(arylene sulfide) compositions. In another aspect, this invention relates to processes for the production of poly(arylene sulfide) compositions useful in the preparation of fibers and monofilaments.

BACKGROUND OF THE INVENTION

The production of poly(arylene sulfide) polymers for a variety of industrial and commercial uses is known. The use of poly(arylene sulfide) polymers has been found to be desirable due to the high chemical, temperature, and electrical resistance of the polymers. U.S. Pat. No. 3,919,177 describes a commercially useful method for preparing poly(arylene sulfide) polymers, however, the process of preparing poly(arylene sulfide) polymers has been further developed to provide polymers having improved properties and in some cases more specialized uses in industry.

For example, poly(arylene sulfide) polymers have been used to produce fibers and monofilaments. Poly(arylene sulfide) polymers produced according to conventional processes often present problems when spinning the polymers into fibers or monofilaments. Problems faced include fiber and filament breakage, poor color of the resulting fibers or monofilaments, and die face fouling as well as poor spinability of the polymer itself. Certain of these problems are caused by the presence of volatile components in the polymer, such as low molecular weight poly(arylene sulfide) (i.e., oligomers), unreacted monomers, salt by-products, and the like. Other problems are due to the lack of oxidative stability or melt stability necessary for the processing at elevated temperatures for extended time periods employed in making fibers or monofilaments. It would therefore be desirable to achieve a process for the production of a poly(arylene sulfide) polymer that could be spun into fibers and monofilaments without the attendant problems listed above.

It is therefore an object of this invention to provide a process for the production of poly(arylene sulfide) compositions having lower amounts of impurities and volatile components.

It is another object of this invention to provide a process for the production of poly(arylene sulfide) compositions demonstrating good oxidative and melt stability.

Yet another object of this invention is to provide a method for preparing a poly(arylene sulfide) composition useful for producing fibers and monofilaments.

STATEMENT OF THE INVENTION

In accordance with this invention, a method is provided for producing a poly(arylene sulfide) composition by a) contacting under suitable conditions a sulfur source, a dihalogenated aromatic compound, a polar organic compound, a base, and an alkali metal carboxylate, wherein the molar ratio of the base to sulfur source does not exceed about 0.98:1 before dehydration, in order to form a substantially liquid mixture comprising poly(arylene sulfide) polymer, polar organic compound and water; b) slowly cooling to form a slurry comprising solid poly(arylene sulfide) particles and liquid comprising the polar organic compound and water, and adding an effective amount of at least one extraction agent; c) contacting the poly(arylene sulfide) particles with an aqueous solution containing calcium ions; and d) recovering the poly(arylene sulfide) composition. The poly(arylene sulfide) composition produced according to this invention contains fewer impurities and volatile components and is thus useful for the preparation of poly(arylene sulfide) fibers and monofilaments.

DETAILED DESCRIPTION OF THE INVENTION

The poly(arylene sulfide) compositions of this invention are produced by contacting under suitable conditions a sulfur source, one dihalogenated aromatic compound and optionally other halogenated aromatic compounds, a polar organic compound, a base, and an alkali metal carboxylate.

The dihalogenated aromatic compounds suitable for use in this invention can be represented by the formula

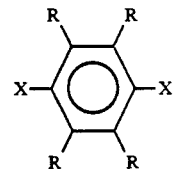

wherein X is a halogen, and R is selected from hydrogen, alkyl, cycloalkyl, aryl, alkylaryl, and arylalkyl radicals having from about 6 to 24 carbon atoms. Examples of suitable dihalogenated aromatic compounds include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-5-(3-methylcyclopentyl)-2,5-dichlorobenzene, and the like, and mixtures thereof. The preferred dihalogenated aromatic compound for use in this invention is p-dichlorobenzene (DCB).

The poly(arylene sulfide) can optionally contain up to about 10 mole % of di- or tri-halogenated aromatic comonomers that do not adversely affect fiber formation or properties. Such comonomers can contain ether, sulfone, ketone, biphenyl, or naphthalene groups and can include meta-substituted dihaloaromatics.

The polar organic compounds suitable for use in this invention include cyclic or acyclic organic amines having from 1 to 10 carbon atoms per molecule. Suitable examples include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrolidone, ε-caprolactam, N-methyl-ε-caprolactam, N,N'-ethylenedi-2-pyrrolidone, hexamethylphosphoramide, tetramethylurea, and the like, and mixtures thereof. The preferred polar organic compound for use in this invention is N-methyl-2-pyrrolidone (NMP).

Any suitable source of sulfur can be used in this invention. Suitable sources of sulfur include thiosulfates, substituted and unsubstituted thioureas, cyclic and acyclic thioamides, thiocarbamates, thiocarbonates, trithiocarbonates, organic sulfur-containing compounds selected from mercaptans, mercaptides and sulfides, hydrogen sulfide, phosphorous pentasulfide, carbon disulfides and carbon oxysulfides, and alkali metal sulfides and bisulfides, and the like, or mixtures thereof. It is generally preferred to use as a source of sulfur in this invention an alkali metal bisulide wherein the alkali metal is selected from sodium, potassium, lithium, rubidium, and cesium. The preferred alkali metal bisulfide is sodium bisulfide (NaSH). The alkali metal bisulfide usually is employed in hydrated form and/or as an aqueous mixture, preferably in the liquid state at the temperature of use. Although the water present with the alkali metal bisulfide can vary over a considerable range, generally the alkali metal bisulfide will be present in the solution or hydrate in an amount within the range of about 20 to about 70 weight percent, preferably about 25 to about 60 weight percent, based on the total weight of alkali metal bisulfide plus water associated therewith.

Suitable bases for use in this invention are alkali metal hydroxides including lithium hydroxide, sodium hydroxide, potassium hydroxide, rubidium hydroxide, cesium hydroxide, and mixtures thereof. If desired, the hydroxide can be produced in situ by the reaction of the corresponding oxide with water. The preferred base for use in this invention is sodium hydroxide (NaOH). Although the alkali metal hydroxide can be employed in anhydrous form, preferably it is employed in hydrated form and/or as an aqueous mixture, more preferably in the liquid state at the temperature of use. Although the water present with the alkali metal hydroxide can vary over a considerable range, generally the alkali metal hydroxide will be present in the solution or hydrate in an amount up to about 70 weight percent, preferably about 25 to about 60 weight percent, based on the total weight of alkali metal hydroxide plus water associated therewith.

Suitable alkali metal carboxylates which can be employed in this invention can be represented by the formula $RCO_2M$, where R is a hydrocarbyl radical selected from alkyl, cycloalkyl, and aryl and combinations thereof such as alkylaryl, alkylcyclcoalkyl, cycloalkylalkyl, arylalkyl, arylcycloalkyl, alkylarylalkyl and alkylcycloalkylalkyl, wherein the hydrocarbyl radical having 1 to about 20 carbon atoms, and M is an alkali metal selected from the group consisting of lithium, sodium, potassium, rubidium and cesium. Preferably R is an alkyl radical having 1 to about 6 carbon atoms or a phenyl radical and M is lithium or sodium. If desired, the alkali metal carboxylate can be employed as a hydrate or as a solution or dispersion in water. If desired, the alkali metal carboxylate can be produced in situ by the reaction of the corresponding carboxylic acid and an alkali metal hydroxide or carbonate.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptonoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof. The preferred alkali metal carboxylate for use in this invention is sodium acetate (NaOAc).

Although the ratio of reactants can vary considerably, the ratio of gram-moles of dihalogenated aromatic compound to gram-atoms of divalent sulfur in the sulfur source should be within the range of from 0.9 to about 1.3, and preferably from 0.95 to 1.1. The gram-moles of alkali metal carboxylate per gram-mole of dihalogenated aromatic compound should be within the range of from 0.05 to about 4 and preferably from 0.1 to 2. The amount of polar organic compound employed in the polymerization reaction mixture can vary considerably. Generally, the molar ratio of polar organic compound to alkali metal bisulfide will be within the range of about 1:1 to about 10:1, preferably within the range of about 2:1 to about 5:1. The molar ratio of the base to the sulfur source in this invention should not exceed 0.98:1 before dehydration preferably 0.96:1.

In the production of poly(arylene sulfide) polymers by the process of this invention, the alkali metal hydroxide and alkali metal carboxylate are usually mixed with an aqueous mixture comprising the alkali metal bisulfide and the polar organic compound. After addition of the alkali metal hydroxide substantially all of the water is removed by a distillation procedure to provide a dehydrated composition derived from alkali metal hydroxide, alkali metal bisulfide and polar organic compound. The dihalogenated aromatic compound and optionally other halogenated aromatic compounds are then combined with this dehydrated mixture to form the polymerization reaction mixture.

The temperature at which the polymerization can be conducted can vary over a wide range and will generally be within the range of from 215° C. to 375° C. and preferably from 225° C. to 285° C. The reaction time will be within the range of from 10 minutes to about 3 days and preferably 1 hour to 8 hours. The pressure need be only sufficient to maintain the dihalogenated aromatic compound and the organic compound substantially in the liquid phase, and to retain the sulfur source therein.

At the termination of the polymerization reaction, the reaction mixture comprising poly(arylene sulfide) polymer, polar organic compound, and water will generally be in a substantially liquid form at the reaction temperatures. According to this invention, the poly(arylene sulfide) polymer is recovered by slowly cooling the mixture and optionally adding, if desired, a separation agent to the mixture for particle size control. The cooled mixture, a slurry comprising solid poly(arylene sulfide) particles, polar organic compound, non-polymeric and low molecular weight materials, is contacted with an effective amount of at least one extraction agent under conditions suitable for removal of at least a portion of the low molecular weight organic materials from the solid poly(arylene sulfide) polymer.

The use of separation agents for causing separation of molten poly(arylene sulfide) from the polar organic compound is described in U.S. Pat. No. 4,415,729, which is hereby incorporated by reference. The preferred separation agent is water and the quantities employed are typically about 0.05 to about 2 moles of separation agent/mole of polar organic compound when NMP is employed as the polar organic compound. When the separation agent is water and the extraction agent is also NMP, the ratio of extraction agent to separation agent is typically in the range of about 1/1 to 10/1. The addition of the separation agent and slow cooling can be performed in any order or simultaneously, or a portion of the separation agent can be added, followed by a period of slow cooling, followed by the addition of extraction agent, and so on. By "slow cooling", it is meant that no external cooling means is applied to the reactor. Generally the rate of cooling will not exceed about 1° C. (1.8° F.) per minute.

Suitable extraction agents for use in this invention include those compounds which are useful for extracting low molecular weight material and reactants from the poly(arylene sulfide) polymerization reaction mixture. Suitable examples include those polar organic compounds previously listed as polymerization reactants; NMP is the currently preferred extraction agent. The extraction agent is added to the reactor slurry by any of several methods to remove at least a portion of the low molecular weight organic materials present in the solid poly(arylene sulfide). For example, the extraction agent can be added to the cooled slurry or the slurry can be transferred to another vessel containing the extraction agent. Alternately, a portion of the extraction agent can be added to the slurry and that mixture transferred to another vessel containing the remainder of the extraction agent.

The amount of extraction agent added to the polymerization mixture depends upon the extraction agent used and the sequence of addition of extraction agent and cooling employed. For example, the amount of the extraction agent NMP used for extracting poly(phenylene sulfide) is generally in the range of about 0.5/1 to about 2/1 moles of NMP added/moles of NMP used as the polar organic solvent, more preferably 0.75 to 1.5 moles extraction agent per mole polar organic compound. Too little extraction agent will result in inefficient removal of the low molecular weight material while a large excess of extraction agent does not improve the extraction, but increases the costs of extraction agent recovery.

Generally, the extraction temperature will be between about 100° C. and about 200° C. At temperatures below 100° C., the extraction process becomes slower and less efficient. Contact times will vary depending on the temperature, but will generally be between a few minutes and several hours. Very short times will result in insufficient extraction and very long times do not result in significant increases in extracted materials. Good agitation of the mixture during extraction improves contact between the solid poly(arylene sulfide) particles and the extraction agent.

Following the extraction step, the mixture can be separated into the solid poly(arylene sulfide) particles and a liquid by conventional methods, such as filtration and centrifugation. The solid poly(arylene sulfide) can be washed with water to remove inorganic by-products of the polymerization.

After the poly(arylene sulfide) particles have been isolated and washed, they are contacted with an aqueous solution containing calcium ions. The calcium ions are introduced as water soluble metal salts, oxides, and hydroxides. Examples include calcium chloride, calcium bromide, calcium acetate, calcium benzoate, calcium hydroxide, calcium oxide, and mixtures thereof. The currently preferred source of calcium ions is calcium acetate. The treating of the polymer with the calcium ion solution should be carried out at ambient temperature or at an elevated temperature which is below the melting point of the polymer for a sufficient period of time. Operation of this step is easily accomplished at temperatures in the range of 50°-85° C. (122°-185° F.), using wet polymer. Operation is also feasible at ambient temperature to a temperature not to exceed about 14° C. (25° F.) below the melting point of polymer, preferably about 27° C. (80° F.) to about 271° C. (520° F.).

The time for treatment or contacting can vary greatly depending on the temperature and the nature of the poly(arylene sulfide) polymer. It generally will be within the range of 5 minutes to 24 hours, preferably 30 minutes to 10 hours. In general, it can be said that the contact time decreases with increasing temperature. The pressure should be sufficient to maintain liquid phase conditions which can range from 0 to about 1500 psi. Repeated treatments can be employed, if desired, or the process can be carried out in several phases, if desired.

The polymer/water slurry can consist of 5 to 60 weight percent polymer and more preferably from 10 to 50 weight percent polymer to provide convenient handling and separation factors.

Subsequent to the treatment with calcium ions, the poly(arylene sulfide) composition can be recovered by employing suitable techniques known to those of ordinary skill in the art such as washing with water, centrifugation, filtration, and the like. Typically, the amount of calcium present in the calcium treated and washed poly(arylene sulfide) will be from about 100 to about 1000 ppm, preferably from 200 to 800 ppm. The polymer can be subsequently dried for further use if desired.

In one embodiment of this invention, the poly(arylene sulfide) composition prepared as described above is processed to form fibers and monofilaments. First the poly(arylene sulfide) composition is pelletized using conventional equipment such as single screw or twin screw extruders, preferably equipped with vacuum vents to remove volatiles and moisture. A filtration unit can also be advantageously used to remove impurities. The pellets can then be dried for further use in equipment such as for example a rotary vacuum dryer. The temperature and time period employed in the drying step is not critical, however, excessive times and temperatures should be avoided in order to minimize pellet oxidation.

The poly(arylene sulfide) composition prepared according to this invention can be spun into staple, continuous multifilament, or monofilament fiber using most conventional melt spinning equipment. Generally a metering pump is employed and a 325 mesh screen or finer is employed in the spin pack. Temperatures in the range of about 280°-340° C. are employed, with temperatures in the range of 290° C. to 320° C. preferred. The poly(arylene sulfide) fiber can be drawn at temperatures in the range of 90° to 110° C. using conventional equipment having a draw zone designed to heat the fiber to the appropriate temperature. Subsequent to drawing the fiber a hot roll or heated zone in a temperature range of 100°-200° C. can be used to at least partially crystallize the fiber. The fiber can then be converted into staple by any method known to those of ordinary skill in the art.

The poly(arylene sulfide) composition prepared according to the invention method exhibits those characteristics desirable for a good fiber resin. For example, good quality, linear poly(arylene sulfide) resins ordinarily exhibit a melt flow rate in the range of about 20 to about 500 grams/10 minutes, when measured according to ASTM D 1238 (316° C./5 kg, modified to use a 5 minute preheat). The poly(arylene sulfide) composition prepared according to the invention method exhibits a melt flow rate in the desired range.

The following examples are included for the purpose of illustrating the invention, and are not meant to limit the scope thereof.

EXAMPLES

In the following examples, melt flow (MF) values were determined by the method of ASTM D-1238, Condition 316/5.0 modified to use a 5 minute preheat, the value of MF being expressed as g/10 min. The polymer melt stability was determined by the change in MF between the usual MF with a 5 minute hold (MF 5) and a modified MF with a 30 minute hold (MF 30) before extrusion. This melt stability was calculated according to the formula [(MF 30-MF 5)/MF 5]×100 and expressed as % increase. Oxidative stabilities of PPS polymer samples were determined by the change in polymer MF after heating about 10 g of polymer in a small aluminum pan in a forced air oven at 260° C. for 60 minutes (MF-ox). The change in melt viscosity after air oxidation was calculated by [(MF−MF-ox)/MF]×100 and expressed as a % change. A smaller change indicates better oxidative stability.

Solvent extractions were carried out using a Soxhlet extractor with about 50 g of the polymer and either methylene chloride or acetone as the extraction medium over a period of about 7 hours. The methylene chloride or acetone extract was evaporated and then vacuum dried in a warm (80° C.) vacuum oven overnight. The quantity extracted from the original sample is expressed as a weight percent extracted based on the original sample weight.

Polymer ash levels were determined by burning a weighed portion of the polymer in a platinum dish. Residual carbonaceous material was removed by heating at 538° C. (1000° F.) in a muffle furnace. The weight of the residue (ash) is expressed as a percentage of the original weight of the polymer.

Elemental analyses were carried out using neutron activation for chlorine and inductively coupled plasma for other elements. Fiber physical properties were determined on Instron tensile testers.

EXAMPLE I

This example demonstrates the importance of the reduced caustic polymerization recipe for melt and oxidative stability. Polymer 1 was a control polymer made with a higher caustic level and polymer 2 was prepared with a reduced caustic recipe.

An aqueous sodium sulfide solution was prepared by mixing 73.0 lb. (33.1 kg) of a 50.52 weight percent NaOH solution with 87.3 lb. (39.6 kg) of a solution containing 59.17 weight percent of NaSH and 0.12 weight percent of $Na_2S$. This corresponds to NaOH/NaSH mole ratio of 1.003. The solution, plus 23.5 lb. (10.6 kg) of solid sodium acetate and 35.7 gallons (135 l) of NMP were added to a reactor, which was then purged with nitrogen. This mixture was heated to 332° F. (167° C.) and dehydrated by raising the temperature to 445° F. (229° C.) over a period of 81 minutes.

A 134.8 lb. (61.14 kg charge of DCB was added and the reactor mixture was heated to 451° F. (233° C.) and held for 2 hours, achieving a final pressure of 74 psig. The reactor temperature was increased to 510° F. (266° C.) and held for 3 hours, achieving a pressure of 162 psig.

The reactor contents were cooled to about 275° F. (135° C.) and 10 gallons (37.8 l) of liquid water were added to the reactor while the contents were stirred at a rotor speed of about 400 rpm. Cooling continued until a temperature of 225° F. (107° C.) was reached. The entire cooling time from 510° F. (266° C.) to 225° F. (107° C.) was approximately 117 minutes.

The slurry was then filtered and the filtrate was washed once with 80 gallons (302.4 l) of deionized water containing 160 g of NaOH at 159° F. (70° C.) and twice with 80 gallons of water containing 316 g of calcium acetate at 160° F. (71° C.). The filter cake was dried at 200°-300° F. (93°-149° C.) and atmospheric pressure for about 3 hours to produce polymer 1.

Polymer 2 was produced in a manner similar to the procedure described above for polymer 1, except that 68.8 lbs. (31.1 kg) of the NaOH solution was used to give a NaOH/NaSH mole ratio of 0.946. A 28.0 lb (12.7 kg) charge of sodium acetate was added to the mixture before dehydration, and the dehydration time was 87 minutes from the initial 330° F. (166° C.) to the final 440° F. (229° C.). The water quench step took 126 minutes from 510° F. (266° C.) to 225° F. (107° C.). Polymer 2 was recovered and washed as described above except for a calcium acetate wash temperature of 180° F. (82° C.).

A determination of the melt stability of polymers 1 and 2 was made in a melt flow (MF) unit and the results are shown in Table I.

TABLE I

| | | PPS Melt Stability | | |
|---|---|---|---|---|
| | | Melt Flow g/10 min., after: | | MF Increase |
| Polymer | Type | 5 min. | 30 min. | % |
| 1 | Standard Caustic | 171 | 281 | 64 |
| 2 | Low Caustic | 205 | 269 | 31 |

Polymer 2, made with a reduced caustic recipe, had less change in MF after a 30 minute hold than polymer 1, made with a higher caustic recipe.

A determination of the oxidative stability of polymers 1 and 2 was made by determining the change in MF of the samples by heating them in a forced air oven at 260° C. (500° F.) for one hour. The results are shown in Table II.

TABLE II

| | | PPS Oxidative Stability | | |
|---|---|---|---|---|
| | | HF, g/10 min. | | Change |
| Polymer | Type | Original | Oxidized | % |
| 1 | Standard Caustic | 171 | 3 | 98 |
| 2 | Low Caustic | 205 | 54 | 74 |

Polymer 2, prepared with the reduced caustic recipe, also exhibited less change in MF during the oxidative treatment than polymer 1, prepared using the higher caustic recipe.

EXAMPLE II

This example illustrates the value of using NMP as the extraction agent to reduce the level of extractable materials in PPS products.

The polymers in this and several of the following examples were prepared in a manner similar to the procedure described in Example I except for changes noted. All NaOH solutions were about 48 weight percent, NaSH solutions were either 25 or 47 weight percent, and sodium acetate solutions were about 42 weight percent. The cooling rate from the conclusion of the polymerization cycle was about 1° C./minute. All washes were done with about 770 liters of liquid. Filtrations were done with a shaker screen using a 200 mesh screen. Polymer drying was carried out with a nitrogen cover in the dryer.

The amounts of NaOH, NaSH, and DCB used for each polymer are shown in Table III.

TABLE III

| | PPS Polymerization Recipes | | | |
|---|---|---|---|---|
| Polymer | NaSH kg moles | NaOH kg moles | DCB kg moles | Mole Ratio NaOH/NaSH |
| 3 | 1.125 | 1.086 | 1.103 | 0.965 |
| 4 | 1.11 | 1.096 | 1.10 | 0.987 |
| 5 | 1.10 | 1.096 | 1.10 | 0.996 |
| 6 | 1.12 | 1.081 | 1.10 | 0.965 |

In each polymerization run, 0.37 kg moles (30.34 kg) of sodium acetate and 3.33 kg moles (289.7 kg) of NMP were used. In Run 3, the polymerization temperature was increased from 220° C. to 270° C. in 160 minutes and then held at 270° C. for 110 minutes. Polymer 5 was prepared with 160 g of sodium dithionite ($Na_2S_2O_4$) added in two portions of 80 g $Na_2S_2O_4$, 0.25 g NaOH, and 385 g of $H_2O$ to the mixture before dehydration and before the polymerization. Polymers 4, 5, and 6 were prepared with a continuous increase in the polymerization temperature from 235° C. to 270° C. over a 170 minute period.

In all four polymerizations, 18 kg of liquid water was added at the end of the polymerization at 270° C. The cooled mixtures in Runs 3 and 5 were added to water, filtered, and washed. In Runs 4 and 6, the cooled mixtures were added to 330 liters of NMP at 70° C., filtered, and washed. The washing procedure involved one wash with ambient water, two washes with 70° C. water, a wash at 70° C. with water containing 480 g of calcium acetate, and a final rinse with water at 70° C.

Polymers 3 and 4 were extracted with methylene chloride to determine the amounts of extractable materials. The results are set out in Table IV.

TABLE IV

| | PPS Polymer Properties | |
|---|---|---|
| Polymer | Type | Solvent[a] Extraction wt. % |
| 3 | Water Quench | 2.7 |
| 4 | NMP Extracted | 1.3 |

[a] Methylene chloride was employed as the solvent.

The results show that NMP extracted polymer 4 contains a lower level of extractable material than the water quench recovered polymer 3. The amounts of several inorganic elements in polymers 4 and 5 were determined for comparison.

TABLE V

| | PPS Polymer Properties | | | | |
|---|---|---|---|---|---|
| Polymer | Type | Fe ppm | Ni ppm | Ca ppm | Na ppm | Cl wt. % |
| 5 | Water Quench | 3.8 | <0.5 | 569 | 531 | 0.28 |
| 4 | NMP Extracted | 3.7 | <0.5 | 512 | 121 | 0.14 |

As shown in Table V, the NMP extracted polymer 4 contained less sodium and chloride than the water quench recovered polymer 5.

Polymers 3 and 6 were combined with other batches of PPS prepared in a similar manner and were pelletized on a 53 mm twin-screw extruder with a vacuum vent at 26 inches of mercury vacuum and a screen pack containing a 325 screen. The pellets were dried in a rotary vacuum oven at about 125° C. for about 5 hours and were spun into continuous filaments at 290° C. on a 2 inch diameter extruder equipped with an extended area Fluid Dynamics (Brunswick Corp., Deland, Fla.) Dynalloy X13L filter, metering pump, and four spinnerets containing 100 0.48 mm diameter holes. The undrawn fibers were drawn about 3.4 x in a steam chest at 100° C. and annealed (heatset) at about 150° C. on hot rolls. The fiber spinning results and physical properties are described in Table VI.

TABLE VI

| | PPS Fiber Properties | | | | |
|---|---|---|---|---|---|
| Polymer | Type | MF, g/10 min | Spin Time Hours | No. of Pack Wipes | Tenacity, gpd | Elong., % |
| 3 | Water Quench | 156 | 2.8 | 2 | 3.1 | 38 |
| 6 | NMP Extracted | 119 | 3.2 | 1 | 3.2 | 35 |

The water quench recovered polymer 3 required two wipes of the spinneret face to remove accumulated oil during the 2.8 hour spinning time. However, the NMP extracted polymer 6, prepared according to the present invention, required only one wipe of the spinneret face during the 3.2 hour spinning time. The fiber physical properties of the two polymers were similar. Therefore, the NMP extracted polymers of the present invention have had lower levels of volatile materials that can deposit on the spinneret face during fiber spinning.

EXAMPLE III

This example demonstrates the use of a calcium salt wash of a PPS polymer to improve the thermal stability of fiber produced from the polymer. Polymers 7 and 8 were prepared with a dilute, aqueous acetic acid wash to remove inorganic ions. Polymer 9 was prepared with a calcium acetate wash to introduce calcium ions.

The polymerizations of polymers 7-9 were carried out in a manner similar to that described in Example II except for changes noted here. The quantities of NaOH, NaSH, and DCB used are shown in Table VII.

TABLE VII

| | PPS Polymerizations | | | | |
|---|---|---|---|---|---|
| Polymer | NaSH, kg moles | NaOH, kg moles | DCB, kg moles | NMP Wash | Mole Ratio, NaOH/NaSH |
| 7 | 1.11 | 1.102 | 1.105 | Yes | 0.993 |
| 8 | 1.12 | 1.092 | 1.10 | Yes | 0.975 |
| 9 | 1.12 | 1.092 | 1.105 | No | 0.975 |

In all cases, 0.37 kg moles (30.34 kg) of sodium acetate and 3.33 kg moles (329.7 kg) of NMP were used. All polymerizations were carried out at 235° C. for 5 hours and 270° C. for 3 hours. At the conclusion of the polymerization stage at 270° C., 18 kg of liquid water were added for polymers 7 and 9, while 9 kg of liquid water were added for polymer 8. The cooled reaction mixtures from polymerizations 7 and 8 were added to 300 liters of NMP, filtered, washed once with ambient water, two times with 70° C. water, once with 177° C. water, then with an acetic acid solution with a pH of 5.0 and 70° C. to remove a portion of the inorganic ions, and once with 70° C. water. The cooled polymerization mixtures from polymerization 9 was diluted with water, filtered, washed once with ambient water, four times with 70° C. water, once with an aqueous solution containing 480 g of calcium acetate and once with 70° C. water wash. All polymers were dried as described in Example II.

These polymers were pelletized using melt temperatures of 305°-317° C. on a 1.25 inch diameter extruder equipped with a screen pack containing a 325 mesh screen in the breaker plate. The pellets were dried overnight in a vacuum oven at 125° C., and then spun into fiber on a 1 inch diameter spinning unit equipped with a metering pump and a 34 hole spinneret with 0.048 inch length and 0.012 inch diameter holes. The results are shown in Table VIII.

TABLE VIII

| | PPS Fiber Production and Properties[a] | | | | | | |
|---|---|---|---|---|---|---|---|
| Polymer | Wash Type | MF, g/10 min | Spin Temp., °C. | Draw Ratio | Tenac. gpd | Elong., % | Time to ½ Toughness[b] |
| 7 | Acid | 130 | 320 | 3.75x | 3.5 | 22 | 55 |
| 8 | Acid | 127 | 320 | 3.75x | 3.6 | 21 | 54 |
| 9 | Ca | 105 | 310 | 3.45x | 3.5 | 21 | >122 |

[a]Fiber properties were determined on fiber heatset (annealed) at 200° C. for 30 minutes.
[b]Number of days at 200° C. to reach ½ of the original fiber toughness (½ × tenacity × elongation).

After drawing the fiber samples over a hot plate at 100° C. and heat setting the fibers on metal tubes at 200° C. for 30 minutes, the fibers physical properties set out in Table VIII were similar. In an evaluation of the fiber thermal stability, the fibers were aged in a forced air oven at 200° C. on metal tubes. As shown in Table VIII, the calcium treated polymer 9 was more thermally stable, that is, it reached one-half of its toughness (½ × tenacity × elongation), later than the acid-washed polymers 7 and 8.

EXAMPLE IV

This example illustrates a large scale production of PPS polymer and fiber using the present invention. Polymer 10 is a comparative polymer made by conventional solvent flashing and polymer 11 was made with the NMP extraction of the present invention.

In the production of a typical batch of PPS for polymer 10, an aqueous sodium sulfide solution was prepared by mixing 1835 lb. (832.4 kg) of a 50.26 weight percent NaOH solution with 2171 lb. (984.8 kg) of a solution containing 59.86 weight percent NaSH and 0.100 weight percent NaOH. The NaOH/NaSH mole ratio was 0.997. This solution, plus 4652 lb. (2110 kg) of NMP and 200 gallons of a 30 weight percent NaOAc, were added to the reactor. This mixture was first heated to 273° F. (134° C.) and then dehydrated by raising the temperature to a final temperature of 405° F. (207° C.) during a time period of 65 minutes.

Subsequently, the dehydrated mixture was transferred to a polymerization reactor and 3425 lb. (1554 kg) of DCB and 2449 lb. (1111 kg) of NMP (to flush the dehydration vessel) were added to the polymerization reactor. The entire reactor mixture was heated for 145 minutes from initial conditions of 407° F. (208° C.) and 9 psig to 475° F. (246° C.) at 71 psig. The reactor conditions were then increased to 500° F. (260° C.) and 175 psig, and 350 ml of 1,2,4-trichlorobenzene (TCB) were added 65 minutes after the start of the temperature increase. After the TCB was charged, the reactor pressure was increased to 235 psig with $CO_2$ and the polymerization was continued for another 30 minutes to final conditions of 510° F. (266° C.) and 219 psig.

The polymerization mixture was concentrated by partial solvent flashing at about 510° F. (266° C.) while the pressure was reduced from 218 psig to 60 psig during a time interval of 49 minutes. Finally the concentrated slurry was further heated to about 540° F. (282° C.) and flashed in a blender heated to 460° F. (238° C.) for 58 minutes. The dry, salt-filled PPS was washed with water at ambient temperature and filtered on a belt filter. The filter cake was slurried in water and washed at 375° F. (190° C.) and 240 psig with steam condensate water and plant water makeup as needed, cooled to 190° F. (88° C.) and filtered on a belt filter. It was then dried at about 290° F. (143° C.) at atmospheric pressure with a residence time of about 30 minutes.

This batch of solvent flashed PPS was combined with several similar batches to produce polymer 10.

Polymer 11 was produced using a reduced caustic recipe, NMP extraction, and calcium acetate wash. Several batches of the polymer were combined to produce a lot containing about 2400 kg. A typical polymerization recipe used 1.120 kg moles of NaSH, 1.092 kg moles of NaOH, 1.110 kg moles of DCB, 0.37 kg moles of sodium acetate, and 3.33 kg moles of NMP. The NaOH/NaSH mole ratio was 0.975. A procedure similar to that described for polymers 4 and 6 in Example II was used except that one additional 70° C. wash was done before the calcium acetate wash. This polymer batch had a melt flow of 168 g/10 min.

Polymers 10 and 11 were pelletized on a 4.5 inch diameter single screw extruder equipped with an open vent, a screen changer with a 325 mesh screen and a water ring pelletizer.

The pellets of polymers 10 and 11 were compared and the results set out in Table IX.

TABLE IX

PPS Pellet Properties

| Polymer | Type | MF, g/10 min. | Hunterlab Color, L[a] | Ash, wt. % |
|---|---|---|---|---|
| 10 | Solvent Flashing | 110 | 43 | 0.70 |
| 11 | NMP Extraction | 138 | 72 | 0.22 |

| Polymer | Fe, ppm | Ni, ppm | Ca, ppm | Na, ppm | Cl, wt. % |
|---|---|---|---|---|---|
| 10 | 5 | 11 | 483 | 1290 | 0.29 |
| 11 | 1 | —[b] | 502 | 136 | 0.22 |

[a] Hunterlab L values measure light reflected from the sample with 100 = white and 0 = black.
[b] Below detectable limits.

Table IX shows that invention polymer 11 is lighter in color and lower in ash, iron, nickel, sodium, and chlorine than control polymer 10.

Invention polymer 11 was spun into fiber using pellets dried in a commercial forced air hopper dryer at about 100° C. The spinning was performed using a 2.5 inch diameter extruder equipped with an extended area Fluid Dynamics (Brunswick Corp., Deland, Fla.) Dynalloy X13L filter, metering pump, and 12 spinnerets with 100 0.48 mm diameter holes per spinneret. A 325 mesh screen was present in the spin pack. The spinning performance was very good with very slow filter and spin pack pressure increases and little die face fouling. The PPS fiber was collected on tubes at 900 m/m. Four fiber packages were plied and drawn in a steam chest using 4–8 psig steam. Drawing conditions were 3.27× draw ratio with an ambient temperature feed roll at 100 m/m and 100° C. draw roll temperature. The drawn fiber was 1212 denier with 3.0 gpd tenacity and 22% elongation.

A control resin similar to polymer 10 was pelletized and spun into fiber as described above. The Fluid Dynamics filter and spin pack screens increased in pressures more rapidly than with polymer 11. Die face fouling was more frequent than with polymer 11 and the die face was wiped every eight hours. Attempts to draw the fiber in the above-described drawing unit were unsuccessful.

EXAMPLE V

This example demonstrates PPS polymerizations using two types of NMP extraction. Polymers 12 and 13 were prepared in a manner similar to that described in Example IV, for polymer 11 except for the changes described here. Both polymers were prepared using 1.120 kg moles of NaSH, 1.081 kg moles of NaOH, 1.10 kg moles of DCB, 0.37 kg moles of sodium acetate, and 3.33 kg moles of NMP. The NaOH/NaSH mole ratio was 0.965. The polymerization were carried out using a continuous temperature increase from 235° to 270° C. over a 170 minute period. An 18 kg charge of water was added to the reaction mixture near the end of the polymerization stage at 270° C. The reaction mixture from polymer 12 was added to 330 liters of NMP. In polymer 13, 100 liters of the NMP was added to the polymerization mixture at 200° C. and the resulting mixture was added to 220 liters of NMP. Both solutions were filtered and washed as described in Example IV for polymer 11.

Table X contains the results of an evaluation of the two polymers.

TABLE X

PPS Properties

| Polymer | MF, g/10 min. | Ash, wt. % | Na, ppm | Ca, ppm | Acetone Extract, wt. % |
|---|---|---|---|---|---|
| 12 | 185 | 0.22 | 202 | 417 | 0.74 |
| 13 | 184 | 0.20 | 196 | 395 | 0.52 |

Both polymers are similar in viscosity, ash, and levels of sodium and calcium. Polymer 13 has a slightly lower level of acetone extractable material than polymer 12. Both NMP extraction techniques produced PPS polymer with low levels of solvent extractables.

While this invention has been described in detail for purposes of illustration, it is not meant to be limited thereby, but is meant to cover all reasonable modifications within the spirit and scope thereof.

That which is claimed is:

1. A method for producing a poly(arylene sulfide) composition useful in the preparation of fibers and monofilaments, which method comprises:
    (a) contacting a sulfur source, a polar organic compound, a base and an alkali metal carboxylate, under dehydration conditions to form a dehydrated mixture, wherein the molar ratio of said base to said sulfur source does not exceed about 0.98:1 before dehydration, then contacting said dehydrated mixture with at least one dihalogenated aromatic compound under suitable conditions in order to form a resultant substantially liquid mixture comprising poly(arylene polymer) resin, polar organic compound, and water;
    (b) slowly cooling and then adding to said mixture an effective amount of at least one polar organic extraction agent to form a slurry comprising solid poly(arylene sulfide) particles, and liquid containing non-polymeric and low molecular weight materials;
    (c) contacting said poly(arylene sulfide) particles with an aqueous solution containing calcium ions therein; and
    (d) recovering said poly(arylene sulfide) composition.

2. A method according to claim 1 which further comprises, in step (b), the addition of a separation agent prior to said slow cooling.

3. A method according to claim 1 which further comprises, in step (b), slowly cooling said mixture to a temperature in the range of about 150° C. to 230° C. and then adding a separation agent.

4. A method according to claim 1 wherein said polar organic compound and said extraction agent are N-methyl-2-pyrrolidone.

5. A method according to claim 4 wherein the molar ratio of said added extraction agent to said polar organic compound employed is in the range of 0.5:1 to 2:1.

6. A method according to claim 3 wherein said separation agent is water and is added in an amount in the range of about 0.05 to 2 moles per mole of said polar organic compound.

7. A method according to claim 2 wherein said extraction agent and separation agent are added and are a mixture of N-methyl-2-pyrrolidone and water in a molar ratio in the range of about 1:1 to 10:1.

8. A method according to claim 3 wherein said extraction agent and separation agent are added and are a mixture of N-methyl-2-pyrrolidone and water in a molar ratio in the range of about 1:1 to 10:1.

9. A method according to claim 1 wherein in step (c), said aqueous solution is an aqueous solution of calcium acetate.

10. A method according to claim 1 wherein in step (d) comprises a conventional filter recovery.

11. A method according to claim 1 wherein said sulfur source is sodium bisulfide.

12. A method according to claim 1 wherein said base is sodium hydroxide.

13. A method according to claim 1 wherein said alkali metal carboxylate is sodium acetate.

14. A method according to claim 1 wherein said dihalogenated aromatic compound is dichlorobenzene.

15. A method according to claim 1 wherein said polar organic compound is N-methyl-2-pyrrolidone.

16. A method according to claim 1 wherein said slow cooling occurs at a rate of no greater than 1° C./min.

17. A method according to claim 1 wherein the melt flow rate of said recovered poly(arylene sulfide) composition is in the range of about 20 to 500 g/10 min.

18. A method for producing a poly(phenylene sulfide) composition which comprises:
   (a) contacting sodium bisulfide, N-methyl-2-pyrrolidone, sodium hydroxide and sodium acetate, wherein the molar ratio of sodium hydroxide to sodium bisulfide does not exceed 0.98:1;
   (b) dehydrating the resulting mixture;
   (c) adding p-dichlorobenzene to form a reaction mixture and maintaining said reaction mixture at polymerization conditions for a time period sufficient to form a substantially liquid mixture comprising poly(phenylene sulfide) polymer, N-methyl-2-pyrrolidone and water;
   (d) slowly cooling said mixture to form a slurry comprising solid poly(phenylene sulfide) particles and N-methyl-2-pyrrolidone, and adding to said liquid mixture an extraction agent in an amount in the range of 0.75 to 1.5 moles per mole of N-methyl-2-pyrrolidone;
   (e) contacting said solid poly(phenylene sulfide) resin particles with an aqueous solution of calcium acetate; and
   (f) recovering said poly(phenylene sulfide) composition.

19. A poly(arylene sulfide) polymer produced by the process of claim 1.

20. A poly(arylene sulfide) polymer produced by the process of claim 18.

21. A poly(arylene sulfide) composition produced by the sequence of process steps recited in claim 1, wherein said poly(arylene sulfide) polymer has relatively lower amounts of impurities and volatile components and improved oxidative and melt stability when compared to a poly(arylene sulfide) composition prepared by a process which does not contain the sequence of process steps recited in claim 1.

22. A poly(arylene sulfide) composition produced by the sequence of process steps recited in claim 18, wherein said poly(arylene sulfide) polymer has relatively lower amounts of impurities and volatile components and improved oxidative and melt stability when compared to a poly(arylene sulfide) composition prepared by a process which does not contain the sequence of process steps recited in claim 18.

23. A fiber produced from the poly(arylene sulfide) composition of claim 19.

24. A fiber produced from the poly(arylene sulfide) composition of claim 20.

* * * * *